United States Patent [19]

Hubbard

[11] 4,017,871
[45] Apr. 12, 1977

[54] MARKER WITH THREE PHASE INK CIRCUIT

[75] Inventor: James R. Hubbard, Moorestown, N.J.

[73] Assignee: Graphic Controls Corporation, Cherry Hill, N.J.

[22] Filed: Feb. 9, 1976

[21] Appl. No.: 656,333

[52] U.S. Cl. .......................................... 346/140 R
[51] Int. Cl.² ....................................... G01D 15/16
[58] Field of Search ....................... 346/140, 140 A

[56] References Cited

UNITED STATES PATENTS

| | | | |
|---|---|---|---|
| 1,096,747 | 5/1914 | Parodi | 346/140 A UX |
| 1,296,305 | 3/1919 | Mehren | 346/140 |
| 3,441,950 | 4/1969 | Miller | 346/140 A |
| 3,739,384 | 6/1973 | Harkins | 346/140 A UX |
| 3,778,840 | 12/1973 | Dahl | 346/140 |

Primary Examiner—George H. Miller, Jr.
Attorney, Agent, or Firm—Miller & Prestia

[57] ABSTRACT

Marker includes a three-phase ink circuit to transport ink from a large capacity reservoir through an intermediate capillary phase to a generally porous writing tip. Each phase of the ink circuit contains capillary ink transporting material. Arrangement of the phases in order of increasing capillarity draws ink from the low capillarity reservoir through a small diameter intermediate conduit to the generally porous writing tip.

13 Claims, 4 Drawing Figures

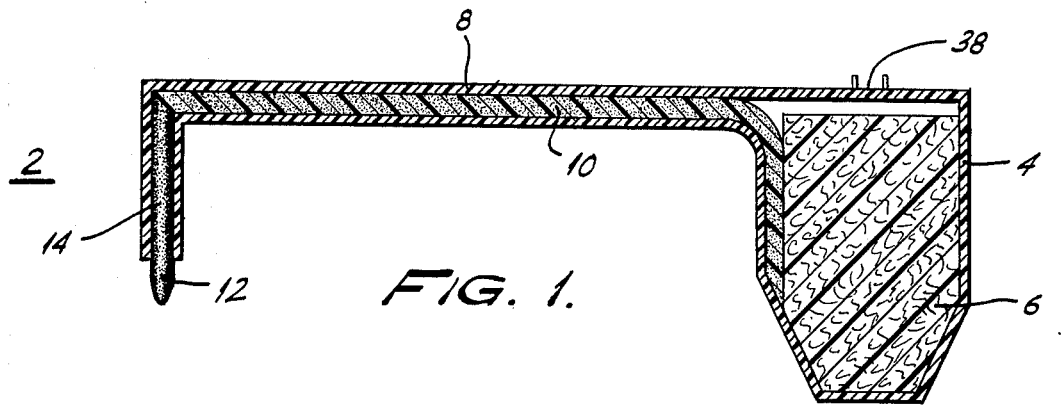
FIG. 1.
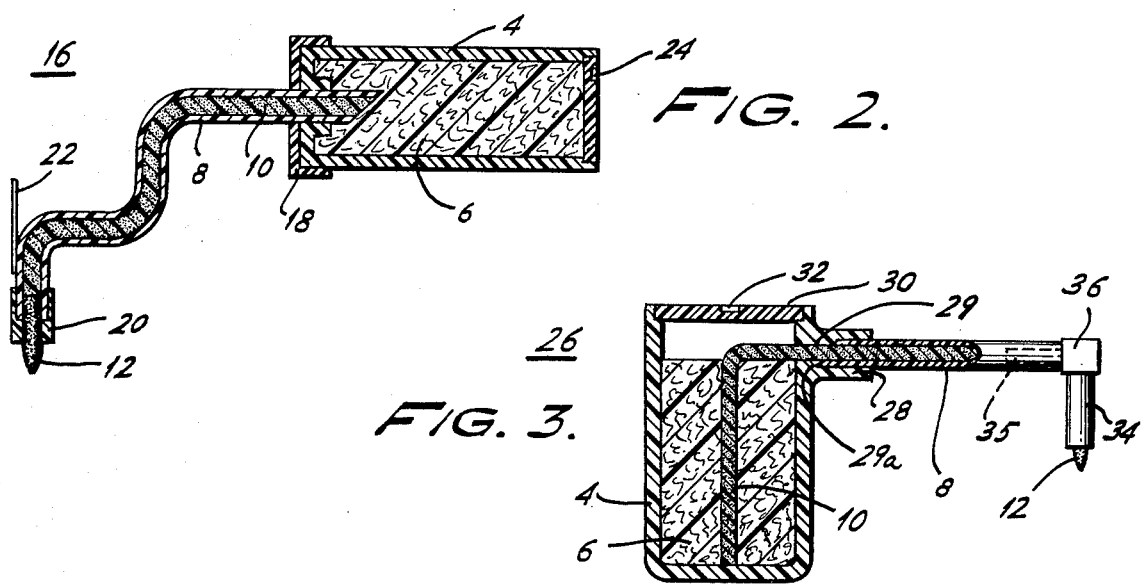
FIG. 2.
FIG. 3.
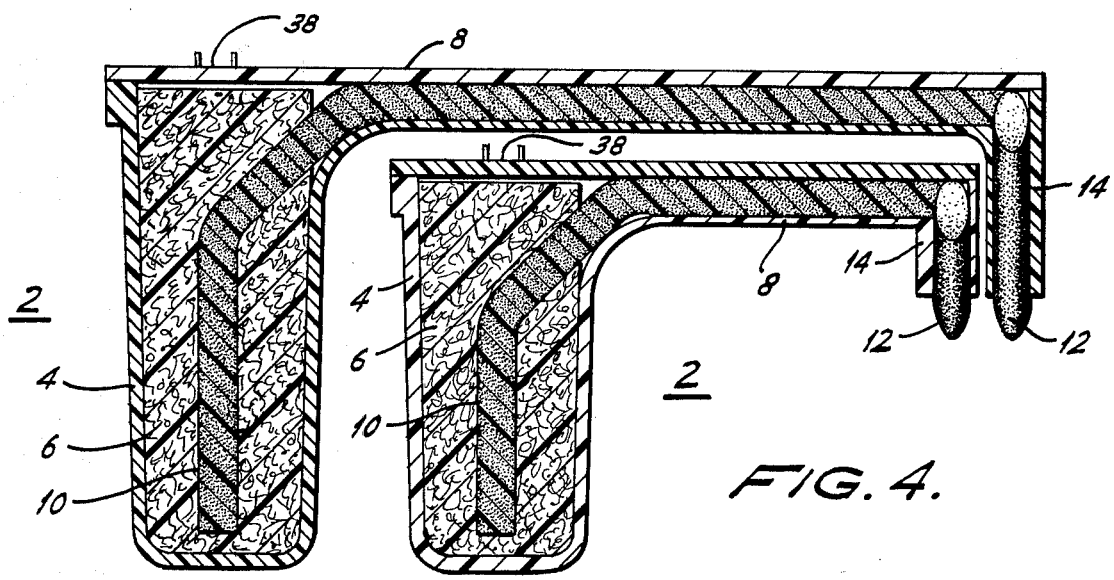
FIG. 4.

MARKER WITH THREE PHASE INK CIRCUIT

Today, many recorder instruments utilize instrument recorder pens having large volume ink supplies in order to minimize time spent on refilling of the ink reservoirs. Often, the nature of the recorder instrument does not allow the positioning of such a large volume reservoir close to the pen writing tip. Thus, there has been a need in the recorder instrument field for a large volume ink supply pen wherein the reservoir is separated from and not positioned near the writing tip.

Many recorder instrument pens deliver ink from an ink reservoir to a remote writing tip via the capillary action of either an intermediate conduit or the writing tip itself. Three of such pens include: U.S. Pat. No. 3,480,372 (Kenny et al.); U.S. Pat. No. 3,264,652 (Squier); and U.S. Pat. No. 1,720,226 (Lovejoy). In many instances, such pens have a tendency to accumulate too much ink at the writing tip, causing wet writing and bleeding.

Further, none of these pens are disposable either in whole or in part. Moreover, because each of these pens require the use of a liquid ink reservoir, such pens sometimes exhibit leakage problems around the reservoir supply.

Thus, it is an object of the present invention to provide a recorder instrument pen having a writing tip remote from its ink supply that delivers ink to a writing tip via capillary action that does not bleed or wet write on the writing surface.

Further, it is a particular object to provide such a pen wherein the amount of pen servicing (i.e. cleaning, delinting and refilling) is kept to a minimum.

Moreover, it is the specific object of the present invention to provide a recorder instrument pen having a writing tip remote from its ink supply wherein either the entire pen assembly or component parts thereof are disposable.

These and other objects, which will become apparent in the further course of the specification, are met, by the three-phase recorder instrument pen of the present invention. Briefly, the pen includes three phases, each containing capillary material. The phases are arranged in order of succeeding degrees of capillarity. Thus, the ink is drawn from the reservoir through intermediate capillary material having a higher degree of capillarity than the reservoir. In turn, the generally porous writing tip draws the ink from the intermediate capillary reservoir to make contact with the writing surface.

In one form of the invention, the entire pen assembly is made of an inexpensive, lightweight, molded or extruded plastic. Thus, the entire pen assembly itself is disposable.

In another form of the invention, both reservoir and a writing tip cartridge, housing the generally porous writing tip, are made of disposable material, thus facilitating easy replacement of two pen components.

For a better understanding of the pen of the present invention, reference may be made to the drawings accompanying and forming a part of the specification wherein like reference characters designate the same or similar parts in various views, wherein:

FIG. 1 is a side cross-sectional view of a disposable marker made in accordance with the present invention;

FIG. 2 is a side cross-sectional view of another form of the invention which includes disposable components of the pen;

FIG. 3 is a partially cutaway side sectional view of still another marker pen made in accordance with the present invention; and FIG. 4 is a partially cutaway side sectional view of two markers, similar to the one shown in FIG. 1, as they would be mounted for tandem use.

Referring now to the drawing, and particularly to FIG. 1, there is shown a disposable three-phase ink circuit marker pen 2. Marker pen 2 includes reservoir body 4 housing capillary reservoir material 6 having a degree of capillarity suitable to retain the ink supply under normal handling, yet able to release the ink to a member of preferred capillarity. Reservoir body 4 also includes optional air vent 38 to allow air entrance into pen 2 to replace the ink used as the pen is writing. Venting may also be provided in a path along the writing tip as is typical in prior art disposable markers. Capillary reservoir material 6 consists of capillary material. Typically, fibrous material such as cellulose acetate is utilized.

The distal end of intermediate conduit 8 extends perpendicularly from reservoir body 4. Intermediate capillary material 10, of higher degree of capillarity than reservoir material 6, mates with reservoir material 6 inside of reservoir body 4.

The proximal end of intermediate capillary material 10 angularly mates with generally porous writing tip 12 housed inside of tip sheathing 14. Writing tip 12 has a higher degree of capillarity than intermediate capillary material 10. Thus, ink stored in reservoir material 6 is drawn by capillary action through intermediate capillary material 10 to writing tip 12 to make contact with a writing surface.

Pen 2 is made from inexpensive, molded plastic components that have been heat sealed together. Thus, when the ink supply runs out, the entire pen may be discarded and replaced by another disposable end.

FIG. 2 shows a preferred embodiment of the three-phase ink circuit marker pen of the present invention. Here, pen 16 includes cylindrical body 4 housing reservoir 6. Cartridge holder 18, containing an aperture therein, is sealingly snapped over one end of cylindrical body 4. Rigid intermediate conduit 8 houses intermediate capillary material 10.

The distal end of rigid intermediate conduit 8, inserted through the aperture in cartridge holder 18, pierces one end wall of cylindrical barrel 4. Intermediate capillary material 10 mates with reservoir material 6 inside of reservoir body 4. Thus, a tight closure, made by both the snug fit of rigid intermediate conduit 8 within cartridge holder 18 and the sealing engagement of cartridge holder 18 over the end of cylindrical body 4, is formed at the area of entrance of rigid intermediate conduit 8 into cylindrical body 4.

The proximal end of intermediate conduit 8 and intermediate capillary material 10 are snugly positioned inside of writing tip cartridge 20, causing writing tip 12 and intermediate capillary material 10 to mate therein. Pointer 22, sealingly attached to intermediate conduit 8, provides a convenient observation guide so that the recorder instrument may be read while the pen is in use. Optional vent 24 may be pierced so as to allow air to enter the pen to replace the ink used as the pen is writing.

In this preferred form of the invention, both reservoir body 4 containing reservoir material 6 and writing tip cartridge 20 containing writing tip 12 can be made of inexpensive disposable material. Therefore, pen 16 can be easily serviced by merely attaching either a new reservoir body 4, writing tip cartridge 20, or both. This factor decreases potential instrument down time.

FIG. 3 shows still another embodiment of the present invention. Here, pen 26 comprises a bucket or "U" shaped reservoir body 4. Reservoir body 4 contains reservoir material 6 (again, all forms of the invention contain reservoir material having a degree of capillarity sufficient to retain an ink supply under normal handling, yet able to release the ink to a phase of preferred capillarity). Reservoir body 4 is shaped to include a laterally extending intermediate conduit receptacle 28. Also, the top of reservoir body 4 is covered by a heat sealed plug 30 containing pierceable vent 32 so as to provide for optional pen venting.

Intermediate conduit receptacle 28 contains bore 29, through which the distal end of intermediate capillary material 10 extends to mate with reservoir material 6 within reservoir body 4. In this embodiment of the invention, intermediate capillary material 10 extends through the center of reservoir material 6, thus providing a large area mating surface. However, such a large mating area may not be required. The distal end of intermediate conduit 8 is received inside of intermediate conduit receptacle 28 by larger bore 29a concentrically drilled with bore 29.

The proximal ends of both intermediate conduit 8 and intermediate capillary material 10 contained therein, mate with tip cap assembly 32. Tip cap assembly 32 includes tip cap projections 34, 35, and tip cap body 36. The proximal end of intermediate capillary material 10 fits inside of tip cap projection 35, while intermediate conduit 8 fits over tip cap projection 35. Writing tip 12, housed inside of the other tip cap projection 34, angularly mates with the proximal end of intermediate capillary material 10 inside of tip cap body 36. A small portion of writing tip 12 extends downwardly from tip cap projection 34 so as to contact a writing surface.

FIG. 4 shows two pens, similar to the marker illustrated in FIG. 1, in tandem. In this figure, it is apparent that writing tip 12 may mate with intermediate capillary material 10 in any angular disposition to efficiently deliver ink to writing tip 12. In this figure, the length of reservoir body 4, intermediate conduit 8, writing tip 12, and tip sheathing 14 are different for each pen. Thus, in actual use, one pen may pass over top of the other, allowing pens to be used in conjunction with one another on different arms of the same recorder instrument.

All embodiments of the present invention require that capillary material of succeeding degrees of capillarity be used for reservoir material 6, intermediate capillary material 10, and writing tip 12, respectively. Capillary action then draws ink through the three stages, thus providing a fine line, free from wet writing and bleeding.

It will be apparent to those skilled in the art that the present invention is not limited to the particular constructions and arrangements shown and described, but that changes and modifications may be made without departing from the spirit and scope of the invention. The appended claims should be so construed as to cover all such changes and modifications.

I claim:

1. A pen, designed to include a writing tip remote from the pen's ink supply, including in combination:
   a. a reservoir body;
   b. capillary reservoir material, housed inside of said reservoir body, having a degree of capillarity suitable to retain an ink supply under normal handling, yet able to release the ink to a member of preferred capillarity;
   c. an intermediate conduit having a distal end and a proximal end;
   d. intermediate capillary material, housed inside of said intermediate conduit having a higher degree of capillarity than said capillary reservoir material, said intermediate capillary material to have both a distal and proximal end;
   e. a generally porous writing tip, having a higher degree of capillarity than said intermediate capillary material, said distal end of said intermediate capillary material mating with said capillary reservoir material, and said proximal end of said intermediate capillary material mating with said writing tip.

2. A pen, as recited in claim 1, further to include a pierceable vent, said vent placed on said reservoir body above the ink supply level of said capillary reservoir material.

3. A pen, as recited in claim 1, wherein said porous writing tip is housed within a tubular plastic sheathing, a small portion of said tip extending therefrom to contact a writing surface.

4. A pen, as recited in claim 1, wherein said reservoir body consists of a bucket shaped material, a plug sealed on the open end thereof.

5. A pen, as recited in claim 1, further including:
   a. a tip cap assembly including a tip cap body with two tip cap projections extending therefrom;
   b. an intermediate capillary receptacle adjacent said reservoir body, said distal end of said intermediate conduit extending into said intermediate capillary receptacle, said distal end of said intermediate capillary reservoir material extending through said intermediate capillary receptacle and into said reservoir body to mate with said capillary reservoir material housed therein, said proximal end of said intermediate capillary material fitting inside one tip cap projection, said writing tip fitting inside said other tip cap projection, a small section of said writing tip extending downwardly therefrom to contact a writing surface, said proximal end of said intermediate capillary material mating with said porous writing tip inside of said tip cap body, said proximal end of said intermediate conduit fitting over said tip cap projection that houses said proximal end of said intermediate capillary material.

6. A pen, as recited in claim 5, further including a pierceable vent, said vent located on said plug.

7. A pen, as recited in claim 1, wherein said reservoir body consists of a cylindrically shaped ink cartridge, said ink cartridge being pierced at one end thereof by said distal end of said intermediate conduit, said intermediate capillary material mating with said reservoir material.

8. A pen, as recited in claim 7, further to include a cartridge holder containing an aperture, said distal end of said intermediate conduit fitting through said cartridge holder aperture to pierce one end of said ink cartridge, said cartridge holder being sealingly snapped over said end of said ink cartridge.

9. A pen, as recited in claim 8, further including a pointer fixedly secured to said intermediate conduit.

10. A pen, as recited in claim 8, wherein said ink cartridge is both detachable and disposable.

11. A pen, as recited in claim 10, further including a vent, said vent being located on said ink cartridge end opposite from said pierced end.

12. A pen, as recited in claim 8, further including a writing tip cartridge, said writing tip cartridge housing both said writing tip and said proximal end of said intermediate conduit, said writing tip cartridge adapted to provide for a mating of said proximal end of said intermediate capillary material to said writing tip, a small section of said writing tip extending downwardly from said writing tip cartridge to contact a writing surface.

13. A pen, as recited in claim 12, wherein said writing tip cartridge is detachable and disposable.

* * * * *